US012804274B2

(12) United States Patent
Zhang et al.

(10) Patent No.: US 12,804,274 B2
(45) Date of Patent: Nov. 17, 2026

(54) DATA COLLECTION METHOD AND SYSTEM, AND APPARATUS

(71) Applicant: Yinwang Intelligent Technologies Co., Ltd., Shenzhen (CN)

(72) Inventors: Weisen Zhang, Shenzhen (CN); Junhao Zhang, Shanghai (CN); Jinghuan Yang, Shanghai (CN); Teng Li, Shenzhen (CN); Qiuyuan Tang, Shenzhen (CN); Huayu Li, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/746,754

(22) Filed: Jun. 18, 2024

(65) Prior Publication Data

US 2024/0340544 A1 Oct. 10, 2024

(51) Int. Cl.
*H04N 23/90* (2023.01)
*B60R 1/22* (2022.01)
*H04N 23/661* (2023.01)
*H04N 23/695* (2023.01)

(52) U.S. Cl.
CPC ............... *H04N 23/90* (2023.01); *B60R 1/22* (2022.01); *H04N 23/661* (2023.01); *H04N 23/695* (2023.01)

(58) Field of Classification Search
None
See application file for complete search history.

(56) References Cited

U.S. PATENT DOCUMENTS

| | | | | |
|---|---|---|---|---|
| 2014/0293061 | A1* | 10/2014 | Park | H04N 23/90 348/159 |
| 2016/0253566 | A1* | 9/2016 | Stein | G06V 20/588 348/148 |
| 2017/0126970 | A1 | 5/2017 | Zang | |
| 2017/0267178 | A1* | 9/2017 | Shiga | H10F 39/8053 |
| 2018/0160030 | A1 | 6/2018 | Chaney, Jr. et al. | |
| 2020/0156592 | A1 | 5/2020 | Zaharia | |
| 2020/0382705 | A1* | 12/2020 | Funaki | H04N 23/69 |

FOREIGN PATENT DOCUMENTS

| | | | |
|---|---|---|---|
| CN | 105763845 | A | 7/2016 |
| CN | 106494313 | A | 3/2017 |
| WO | 2020170889 | A1 | 8/2020 |

* cited by examiner

*Primary Examiner* — Eileen M Adams
(74) *Attorney, Agent, or Firm* — WOMBLE BOND DICKINSON (US) LLP

(57) ABSTRACT

Embodiments of this application provide a data collection method and system, and an apparatus, to improve effect of collecting information about an environment around a vehicle. The system includes: an image collection apparatus, including a camera and a drive component, where the drive component is configured to drive adjustment of a photographing angle of the camera, so that in an image collected by the camera, an included angle between a lower side line of a body side of the vehicle and a vertical direction is less than a first angle; and a control system, electrically connected to the image collection apparatus, and configured to send a first control instruction to the image collection apparatus, where the first control instruction is used to control the photographing angle of the camera.

20 Claims, 6 Drawing Sheets

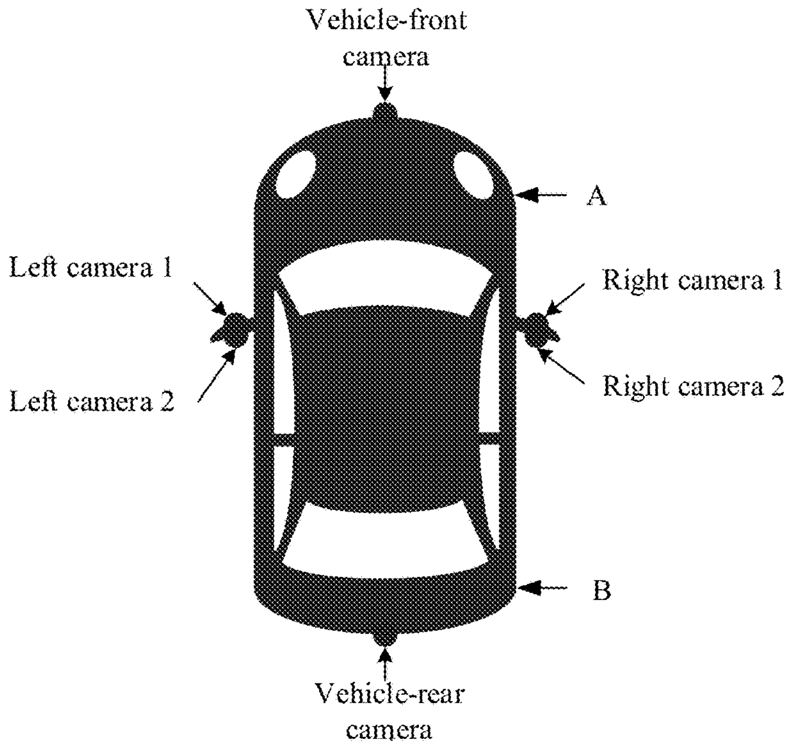

FIG. 3

S401: Send control signaling to an image collection apparatus, where the control signaling is used to control a photographing angle of the image collection apparatus, so that in an image collected by the image collection apparatus, an included angle between a lower side line of a body side of a vehicle and a vertical direction is less than a first angle S402: Obtain image data from the image collection apparatus

FIG. 4

DATA COLLECTION METHOD AND SYSTEM, AND APPARATUS

CROSS-REFERENCE TO RELATED APPLICATIONS

This application is a continuation of International Application No. PCT/CN2021/139589, filed on Dec. 20, 2021, the disclosure of which is hereby incorporated by reference in its entirety.

TECHNICAL FIELD

Embodiments of this application relate to the field of vehicle safety technologies, and more specifically, to a data collection method and system, and an apparatus.

BACKGROUND

A monitoring system is widely used in various fields of finance, military, transportation, homes, and the like for security protection. In public places or private places, corresponding monitoring devices may be installed to monitor some areas. For example, a user may install a monitoring device at home to monitor an area like a window or a doorway, or install a monitoring device on a vehicle to monitor an event like a collision or a scratch that may occur after the vehicle is parked. However, an existing technology of performing monitoring after a vehicle is parked has a problem of poor effect.

SUMMARY

Embodiments of this application provide a data collection method and system, and an apparatus, to improve effect of collecting information about an environment around a vehicle.

According to a first aspect, a data collection system is provided. The system is disposed on a vehicle, and includes: an image collection apparatus, including a camera and a drive component, where the drive component is configured to drive adjustment of a photographing angle of the camera, so that in an image collected by the camera, an included angle between a lower side line of a body side of the vehicle and a vertical direction is less than a first angle; and a control system, electrically connected to the image collection apparatus, and configured to send a first control instruction to the image collection apparatus, where the first control instruction is used to control the photographing angle of the camera.

In this embodiment of this application, the image collection apparatus (which may also be referred to as a camera/camera assembly) and the control system are installed on the vehicle. The image collection apparatus may change a spatial position or a photographing angle (for example, a position in a horizontal direction and/or a vertical direction) of the image collection apparatus under control of the control system, to reduce a monitoring blind area, improve effect of environment detection, reduce a quantity of required cameras within a same detection range, and reduce costs.

In some embodiments, the control system is further configured to: receive a first instruction, where the first instruction is generated in response to enabling of a first mode of the vehicle; and send the first control instruction to the image collection apparatus based on the first instruction, where the first control instruction is used to control the photographing angle of the camera to be the first angle, so that in the image collected by the camera, the included angle between the lower side line of the body side of the vehicle and the vertical direction is less than the first angle.

In the conventional technology, a common camera is used to monitor an environment around a vehicle, and consequently, a monitoring blind area is large. Therefore, during monitoring of a scenario like scratching, a face of a perpetrator is often not photographed. However, in this embodiment of this application, the image collection apparatus and the control system are disposed on the vehicle. In this case, the image collection apparatus may change a spatial position of the camera of the image collection apparatus under control of the control system, or change a photographing angle of the camera of the image collection apparatus, so that the monitoring blind area can be reduced. In addition, the image collection apparatus may change the photographing angle under the control of the control system, to further flexibly adjust the photographing angle, improve monitoring flexibility, and reduce key information omission. In the scenario like scratching, the body side of the vehicle is most likely to be damaged by the outside. Therefore, it is particularly important to monitor the vehicle body. By using the foregoing method, the entire body side may be within a photographing range of the camera. For a linear camera, an effective photographing range of the linear camera may be expanded. For a fisheye surround-view camera, a problem that effective photographing cannot be performed due to edge distortion of the photographing range may be reduced.

In some embodiments, the control system is further configured to send a second control instruction to the image collection apparatus, where the second control instruction is used to control a photographing frequency of the camera to be a first frequency, and the first control instruction and the second control instruction are the same or different.

In some embodiments, the control system is further configured to: obtain sensor data from a sensor, where the sensor is a sensor other than the image collection apparatus disposed on the vehicle or is the image collection apparatus; and determine, based on the sensor data, that an object enters a first range around the vehicle.

In some embodiments, the control system is further configured to send a third control instruction to the image collection apparatus, where the third control instruction is used to control the photographing frequency of the camera to be a second frequency, and the second frequency is greater than the first frequency.

When an object (for example, a pedestrian or another vehicle) enters the first range around the vehicle, the control system may control the camera to track and detect the object until the object leaves the first range; and/or the control system may control the photographing frequency of the camera to increase, to reduce key information omission. For example, the photographing frequency is controlled to be a second frequency, and the second frequency is greater than the first frequency.

In some embodiments, the control system is further configured to control the photographing angle of the camera to be adjusted with the object.

When an object exists in the first range of the vehicle, the photographing angle of the camera of the image collection apparatus is adjusted based on a position of the object, so that the image collection apparatus tracks and detects the object, that is, controls the photographing angle of the camera to be adjusted with the object.

In some embodiments, the control system is further configured to: receive image data from the image collection apparatus; and when a distance between the object in the image data and the vehicle is less than a first distance, trigger saving and/or sending of the image data, or trigger saving and/or sending of key information in the image data.

When the control system detects a possibility that a dangerous situation like scratching occurs around the vehicle, the control system stores image data within a period of time, for example, stores image data within a period of time (for example, 5 minutes) before and after a moment at which the dangerous situation is detected, in a memory, for example, a memory in the control system, or an in-vehicle infotainment hard disk or a USB flash drive; and/or the control system uploads image data to a remote server (for example, a cloud) or another terminal device (for example, a mobile phone or a computer) of a user by using a communication module.

In some embodiments, the control system is further configured to determine the object as a non-interfering object based on an environment factor.

An interfering object may be excluded based on the environment factor, to reduce a misjudgment of the foregoing possibility of occurrence of the dangerous situation, that is, the foregoing object is determined as a non-interfering object, and tracking and photographing are performed on the non-interfering object.

According to a second aspect, a control system is provided. The control system is disposed on a vehicle, and the control system is configured to: send a first control information to an image collection apparatus, where the first control information is used to control a photographing frequency of the image collection apparatus to be a first frequency; obtain sensor data from a sensor, where the sensor data shows that an object enters a first range around the vehicle, where the sensor is a sensor other than the image collection apparatus disposed on the vehicle or is the image collection apparatus; and send second control information to the image collection apparatus, where the second control information is used to control the photographing frequency of the image collection apparatus to be a second frequency, and the second frequency is greater than the first frequency.

In some embodiments, the first control information is further used to control a photographing angle of the image collection apparatus, so that in an image collected by the image collection apparatus, an included angle between a lower side line of a body side of the vehicle and a vertical direction is less than a first angle.

In some embodiments, the control system is further configured to control the photographing angle of the image collection apparatus to be adjusted with the object.

According to a third aspect, a data collection method is provided. The method is used for data collection around a vehicle, and is executed by a control system disposed on the vehicle. The method includes: sending a first control instruction to an image collection apparatus, where the first control instruction is used to control a photographing angle of the image collection apparatus, so that in an image collected by the image collection apparatus, an included angle between a lower side line of a body side of the vehicle and a vertical direction is less than a first angle; and obtaining image data from the image collection apparatus.

In some embodiments, the method further includes: receiving a first instruction, where the first instruction is generated in response to enabling of a first mode of the vehicle; and sending a first control instruction to the image collection apparatus based on the first instruction, where the first control instruction is used to control the photographing angle of the image collection apparatus to be the first angle, so that in the image collected by the image collection apparatus, the included angle between the lower side line of the body side of the vehicle and the vertical direction is less than the first angle.

In some embodiments, the method further includes: sending a second control instruction to the image collection apparatus, where the second control instruction is used to control a photographing frequency of the image collection apparatus to be a first frequency, and the first control instruction and the second control instruction are the same or different.

In some embodiments, the method further includes: obtaining sensor data from a sensor, where the sensor is a sensor other than the image collection apparatus disposed on the vehicle or is the image collection apparatus; and determining, based on the sensor data, that an object enters a first range around the vehicle.

In some embodiments, the method further includes: sending a third control instruction to the image collection apparatus, where the third control instruction is used to control the photographing frequency of the image collection apparatus to be a second frequency, and the second frequency is greater than the first frequency.

In some embodiments, the method further includes: controlling the photographing angle of the image collection apparatus to be adjusted with the object.

In some embodiments, the method further includes: receiving image data from the image collection apparatus; and when a distance between the object in the image data and the vehicle is less than a first distance, triggering saving and/or sending of the image data, or triggering saving and/or sending of key information in the image data.

In some embodiments, the method further includes: determining the object as a non-interfering object based on an environment factor.

According to a fourth aspect, a data collection method is provided. The data collection method is used for data collection around a vehicle, and is executed by a control system disposed on the vehicle. The data collection method includes: sending first control information to an image collection apparatus, where the first control information is used to control a photographing frequency of the image collection apparatus to be a first frequency; obtaining sensor data from a sensor, where the sensor data shows that an object enters a first range around the vehicle, where the sensor is a sensor other than the image collection apparatus disposed on the vehicle or is the image collection apparatus; and sending second control information to the image collection apparatus, where the second control information is used to control the photographing frequency of the image collection apparatus to be a second frequency, and the second frequency is greater than the first frequency.

The control system controls a camera to sense an environment around the vehicle at a low frequency, to implement a low-frequency and low-power-consumption power-on state. When an object approaches the vehicle, the camera is controlled to sense the environment around the vehicle at a higher frequency, to reduce a possibility of key information omission. In this way, power consumption and a requirement for monitoring key information can be balanced, to improve monitoring effect.

In some embodiments, the first control information is further used to control a photographing angle of the image collection apparatus, so that in an image collected by the image collection apparatus, an included angle between a lower side line of a body side of the vehicle and a vertical direction is less than a first angle.

In some embodiments, the control system is further configured to control the photographing angle of the image collection apparatus to be adjusted with the object.

According to a fifth aspect, a data collection method is provided, where the method is executed by a control system disposed on a vehicle, and includes: adjusting an angle of an image collection apparatus, so that in image information collected by the image collection apparatus, an included angle between a lower side line of a body side of the vehicle and a vertical direction is less than a first angle, and the image collection apparatus is disposed on the vehicle; and when an object exists in a first range of the vehicle, adjusting an angle of the image collection apparatus based on a position of the object, so that the image collection apparatus tracks and detects the object.

The data collection method in this embodiment of this application is used to monitor an environment around a vehicle. An existing linear camera, an existing non-linear camera (for example, a fisheye camera), and the like may be reused, so that a new camera does not need to be developed, and costs are reduced. A position of the lower side line of the body side of the vehicle in the image information collected by the image collection apparatus is limited to that the included angle between the lower side line and the vertical direction is less than the first angle, so that a full view of an object can be effectively photographed, a blind area can be reduced, a problem like distortion is avoided, and photographing quality is high. The image information may be an image, or may be collected data. In this embodiment of this application, it may be determined, based on the image information collected by the image collection apparatus, or based on another sensor (for example, a radar sensor) of the vehicle, that an object exists in the first range of the vehicle.

In some embodiments, when an object exists in the first range of the vehicle, the method includes a case in which an object enters the first range of the vehicle.

In this embodiment of this application, that the object exists in the first range of the vehicle includes that the object always exists in the first range of the vehicle. For example, when a user parks the vehicle, the object exists in the first range of the vehicle, and the user detects the object after enabling intelligent parking monitoring and locking the vehicle. That the object exists in the first range of the vehicle also includes a case in which the object is not in the first range of the vehicle and then gradually approaches the vehicle and enters the first range of the vehicle.

In some embodiments, the adjusting an angle of the image collection apparatus based on a position of the object includes: adjusting the angle of the image collection apparatus, so that the object is located at a middle position of an image photographed by the image collection apparatus.

The angle of the image collection apparatus is adjusted, so that the object is located at a middle position of a picture photographed by the image collection apparatus. In this way, a full view of the object can be photographed as completely as possible. In addition, when the image collection apparatus is a fisheye camera, distortion caused by the object being located at an edge of the picture is avoided. It should be understood that the middle position herein may be within a specific range of a center of the photographed image, and may not be a strict middle position, for example, may be a left, right position, an upper position, or a lower position. For example, a circle using the center of the photographed image as a center and using a preset value as a radius belongs to the middle position of the image. Alternatively, when a photographing condition is limited, a position that is as close as possible to the center of circle and that is within a photographing range also belong to the middle position of the image.

In some embodiments, the image collection apparatus is a rotatable camera, or a vehicle component that carries the image collection apparatus is rotatable.

The rotatable camera in this embodiment of this application may be a camera that can rotate, or may be a rotatable vehicle component that carries the camera. The vehicle component that carries the camera may be a rear seat 120 shown in FIG. 1, or may be a component of the vehicle. For example, cameras are installed on left and right rearview mirrors of the vehicle, and the left and right rearview mirrors may rotate automatically, to drive the cameras mounted on the left and right rearview mirrors to rotate.

In some embodiments, the image collection apparatus is a common linear camera or a non-linear camera, where the non-linear camera includes a fisheye camera, an electronic rearview mirror camera, or the like.

According to the vehicle protection method in this embodiment of this application, an existing camera may be reused, and a new camera does not need to be developed, so that costs are reduced. Compared with a common linear camera, the fisheye camera has a larger angle of view and a smaller blind area. If the fisheye camera is used, better effect is achieved.

In some embodiments, the adjusting an angle of the image collection apparatus based on a position of the object, so that the image collection apparatus detects the object includes: adjusting the angle of the image collection apparatus to follow the object for video recording.

In this way, when a person is excessively close to the vehicle, the angle of the image collection apparatus is adjusted, so that the person is at the middle position of the photographed picture. In addition, the image collection apparatus is adjusted in real time based on a movement position of the person, to track and photograph the person. In this way, a behavior of the person on the vehicle may be recorded.

In some embodiments, a video obtained through video recording includes a video clip of the object, and the video clip of the object is stored as a valid video.

In some embodiments, the method further includes: screening a clear multi-frame image that includes the object in the valid video; processing the clear multi-frame image to obtain a processed multi-frame image; and sending the processed multi-frame image to the user.

After the object in the environment is tracked and photographed based on the image collection apparatus, the method in this embodiment of this application further includes: screening a video obtained through video recording, and selecting a valid video from the obtained video for storage. The valid video is a video clip of the object that is clearly photographed. Further, the obtained valid video may be screened to obtain a clear multi-frame image including the object, then super-resolution processing is performed on the clear multi-frame image to obtain a processed multi-frame image, and finally the processed multi-frame image is sent to the user, for example, may be sent to a mobile phone, a mailbox, or an application account associated with the user. In this way, the user can be notified of a vehicle status in a timely manner, and the user can view and save the vehicle status conveniently. Then, the obtained video is deleted to reduce memory usage.

In some embodiments, processing of the clear multi-frame image includes image super-resolution processing, to further improve definition of the clear multi-frame image.

In some embodiments, before the adjusting an angle of the image collection apparatus based on a position of the object, the method further includes: determining, based on a parking position and an interfering object, that the object is a non-interfering object, where the interfering object includes one or more of a shade, a branch, a shadow, and a light spot.

In some embodiments, a method for determining that the object is a non-interfering object includes an image segmentation algorithm and a moving object detection algorithm.

According to the vehicle protection method in this embodiment of this application, an object in an environment is detected, to eliminate an interfering object and reduce false positives.

In some embodiments, when an object exists in the first range of the vehicle, the method further includes: starting up a first sensor, so that the first sensor detects the object, where the first sensor includes one or more of an image collection apparatus, a radar, and a vibration sensor.

According to the vehicle protection method in this embodiment of this application, another sensor is started up in a timely manner based on a position of a detected object, or detection frequency of a started-up sensor is improved, to ensure comprehensive detection of an object that may be dangerous.

In some embodiments, the method further includes: when it is detected that the object enters a second range, adjusting power consumption of the image collection apparatus and the first sensor based on the position of the object, where the second range is less than the first range.

According to the vehicle protection method in this embodiment of this application, power consumption of a sensor is adjusted in real time based on the position of the object, to avoid unnecessary energy waste.

According to a sixth aspect, a control apparatus is provided, including: a processing unit, configured to send a first control instruction to an image collection apparatus, where the first control instruction is used to control a photographing angle of the image collection apparatus, so that in an image collected by the image collection apparatus, an included angle between a lower side line of a body side of a vehicle and a vertical direction is less than a first angle; and a first obtaining unit, configured to obtain image data from the image collection apparatus.

In some embodiments, the control apparatus further includes: a second obtaining unit, configured to obtain a first instruction, where the first instruction is generated in response to enabling of a first mode of the vehicle; and the processing unit is configured to send the first control instruction to the image collection apparatus based on the first instruction, where the first control instruction is used to control the photographing angle of the image collection apparatus to be the first angle, so that in the image collected by the image collection apparatus, the included angle between the lower side line of the body side of the vehicle and the vertical direction is less than the first angle.

In some embodiments, the first obtaining unit is further configured to obtain sensor data from a sensor, where the sensor is a sensor other than the image collection apparatus disposed on the vehicle or is the image collection apparatus; and the processing unit is further configured to determine, based on the sensor data, that an object enters a first range around the vehicle.

In some embodiments, the processing unit is further configured to send a third control instruction to the image collection apparatus, where a third control instruction is used to control a photographing frequency of the image collection apparatus to be a second frequency, and the second frequency is greater than a first frequency.

In some embodiments, the processing unit is further configured to control the photographing angle of the image collection apparatus to be adjusted with the object.

In some embodiments, the first obtaining unit is further configured to receive image data from the image collection apparatus; and the processing unit is further configured to: when a distance between the object in the image data and the vehicle is less than a first distance, trigger saving and/or sending of the image data, or trigger saving and/or sending of key information in the image data.

In some embodiments, the processing unit is further configured to determine, based on an environment factor by performing image segmentation on the image data, that the distance between the object and the vehicle is less than the first distance.

According to a seventh aspect, a control apparatus is provided, including: a processing unit, configured to send first control information to an image collection apparatus, where the first control information is used to control a photographing frequency of the image collection apparatus to be a first frequency; and an obtaining unit, configured to obtain sensor data from a sensor, where the sensor data shows that an object enters a first range around the vehicle, the sensor is a sensor other than the image collection apparatus disposed on the vehicle or is the image collection apparatus; and the processing unit is further configured to send second control information to the image collection apparatus, where the second control information is used to control the photographing frequency of the image collection apparatus to be a second frequency, and the second frequency is greater than a first frequency.

In some embodiments, the first control information is further used to control a photographing angle of the image collection apparatus, so that in an image collected by the image collection apparatus, an included angle between a lower side line of a body side of the vehicle and a vertical direction is less than a first angle.

In some embodiments, the processing unit is further configured to send third control information to the image collection apparatus, where the third control information is used to control a photographing angle of the image collection apparatus to be adjusted with the object.

According to an eighth aspect, a data collection apparatus is provided, including: a processing unit, configured to adjust an angle of the image collection apparatus, so that in image information to be collected by the image collection apparatus, an included angle between a lower side line of a body side of a vehicle and a vertical direction is less than a first angle, and the image collection apparatus is disposed on the vehicle; and an obtaining unit, configured to obtain detection data of a sensor of the vehicle for an environment around the vehicle; a processing unit, configured to: when determining, based on the detection data, that an object exists in a first range of the vehicle, adjust an angle of the image collection apparatus based on a position of the object, so that the image collection apparatus tracks and detects the object.

In some embodiments, when the object exists in the first range of the vehicle, the method includes a case in which the object enters the first range of the vehicle.

In some embodiments, the processing unit is specifically configured to adjust an angle of the image collection apparatus, so that the object is located at a middle position of a picture photographed by the image collection apparatus.

In some embodiments, the image collection apparatus is a rotatable camera, or a vehicle component that carries a camera is rotatable.

In some embodiments, the image collection apparatus is a common linear camera or a non-linear camera, where the non-linear camera includes a fisheye camera, an electronic rearview mirror camera, or the like.

In some embodiments, the processing unit is specifically configured to adjust an angle of the image collection apparatus to follow the object for video recording.

In some embodiments, a video obtained through video recording includes a video clip of the object, and the video clip of the object is stored as a valid video.

In some embodiments, the processing unit is further configured to: screen a clear multi-frame image that includes the object in the valid video; perform image super-solution processing on the clear multi-frame image to obtain a processed multi-frame image; and send the processed multi-frame image to the user.

In some embodiments, the processing unit is further configured to determine, based on a parking position and an interfering object, that the object is a non-interfering object, where the interfering object includes one or more of a shade, a branch, a shadow, and a light spot.

In some embodiments, a method for determining that the object is a non-interfering object includes an image segmentation algorithm and a moving object detection algorithm.

In some embodiments, the processing unit is further configured to start up a first sensor, so that the first sensor detects the object, where the first sensor includes one or more of an image collection apparatus, a radar, and a vibration sensor.

In some embodiments, the processing unit is further configured to: when it is detected that the object enters a second range, adjust power consumption of the image collection apparatus and the first sensor based on the position of the object, where the second range is less than the first range.

According to a ninth aspect, a control apparatus is provided, including at least one processor and an interface circuit, where the interface circuit is configured to communicate with the at least one processor and an image collection apparatus, and the at least one processor is configured to perform the method according to any one of the third aspect to the fifth aspect.

According to a tenth aspect, a control apparatus is provided, including a processor and a memory, where the memory is configured to store program instructions, and the processor is configured to invoke the program instructions to perform the method according to any one of the third aspect to the fifth aspect.

According to an eleventh aspect, a vehicle is provided, including the data collection system according to any one of the first aspect and the second aspect.

In some embodiments, the image collection apparatus is disposed on a rearview mirror of the vehicle or disposed on a body between a headlight and a rearlight of the vehicle.

BRIEF DESCRIPTION OF DRAWINGS

FIG. 3 is a schematic diagram of a possible installation position of a camera on a vehicle according to an embodiment of this application;

FIG. 4 is a schematic flowchart of a data collection method according to an embodiment of this application;

DESCRIPTION OF EMBODIMENTS

The following describes technical solutions of embodiments in this application with reference to accompanying drawings.

In a parking lot scenario (for example, in a sentinel mode), vehicle monitoring may be performed to monitor events such as a collision and a scratch that may occur after a vehicle is parked, and is of great significance to vehicle safety in a scenario in which no person is in the vehicle. However, currently, a camera installed on a vehicle has a problem that a blind area is large and key information cannot be captured, and monitoring effect is not ideal.

In some embodiments of this application, an image collection apparatus (which may also be referred to as a camera/camera assembly) and a control system are installed on the vehicle. The image collection apparatus may change a spatial position or a photographing angle (for example, a position in a horizontal direction and/or a vertical direction) of the image collection apparatus under control of the control system, to reduce a monitoring blind area, improve effect of environment detection, reduce a quantity of required cameras within a same detection range, and reduce costs. Further, the control system is configured to control the image collection apparatus based on image data collected by the image collection apparatus, to adjust the spatial position or the photographing angle of the image collection apparatus, so that a possibility of collecting key information by the image collection apparatus is greatly improved. In this way, the spatial position or the photographing angle of the image collection apparatus may be adjusted in a timely manner based on a status of an image collected by the image collection apparatus, to obtain more effective image information, improve monitoring effect, and reduce a problem that key information (for example, information about a hit-and-run vehicle or a perpetrator that causes an accident) cannot be obtained.

Figure 1:
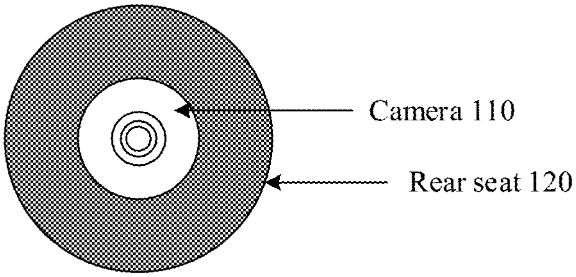
FIG. 1 is a schematic diagram of a structure of an image collection apparatus according to an embodiment of this application.

For ease of understanding embodiments of this application, a structure of the image collection apparatus is first briefly described with reference to FIG. 1. FIG. 1 shows an example of an image collection apparatus 100. As shown in FIG. 1, the image collection apparatus 100 may include a camera 110 and a rear seat 120. A type of the camera 110 is not limited. For example, the camera 110 may be a fisheye surround-view camera or a linear camera, and the rear seat 120 is a support device for installing and fastening the camera 110. The camera 110 and the rear seat 120 may be separated.

In this embodiment of this application, there is a drive component in the rear seat 120, configured to drive adjustment of a spatial position or a photographing angle of the camera 110. For example, the rear seat 120 may include a horizontal motor and/or a vertical motor to control a rotation angle of the camera in a horizontal and/or vertical direction. The horizontal motor and/or the vertical motor may receive control instructions (or control information) from a control system, and accurately locate the camera 110 based on the control instruction by controlling the horizontal motor and/or the vertical motor. In another embodiment, a motor may be used to drive a transmission part, and the transmission part converts output torque of the motor into driving forces in different directions, to drive the camera to adjust positions or photographing angles in different directions. Optionally, a drive chip is further disposed in the rear seat 120, and is configured to receive the control instruction from the control system, and convert the control instruction into a drive signal for controlling the drive component, so that the drive component moves under an action of the drive signal. Alternatively, the drive component may directly move under an action of the control instruction.

The camera 110 may include a lens and a photosensitive element. The photosensitive element may be disposed in the lens of the camera. When an image is sensed, light is transmitted to the photosensitive element of the camera through the lens. An optical image of an object is generated through the lens, and is projected onto the photosensitive element. The photosensitive element may convert an optical signal into an electrical signal.

As an example rather than a limitation, the photosensitive element may be a charge coupled device (CCD), a complementary metal-oxide-semiconductor (CMOS) phototransistor, or the like. The photosensitive element may further transfer the electrical signal to an image processor for processing. The image processor is configured to process the received electrical signal into image data in a required format, so as to provide the image data to a device that has a requirement for the image data, for example, transmit the image data to a display for display, or convert the image data into a required data format for storage or transmission. The image processor may send the processed image data to a memory for storage. Because the camera may photograph in real time, images stored in the memory may be distinguished, for example, by using timestamps. For example, each frame of image may correspond to one timestamp.

It should be understood that both the image processor and the memory may be modules in the image collection apparatus 100, or may be modules in the control system. Although not shown in FIG. 1, this shall not constitute any limitation on this application.

Figure 2:
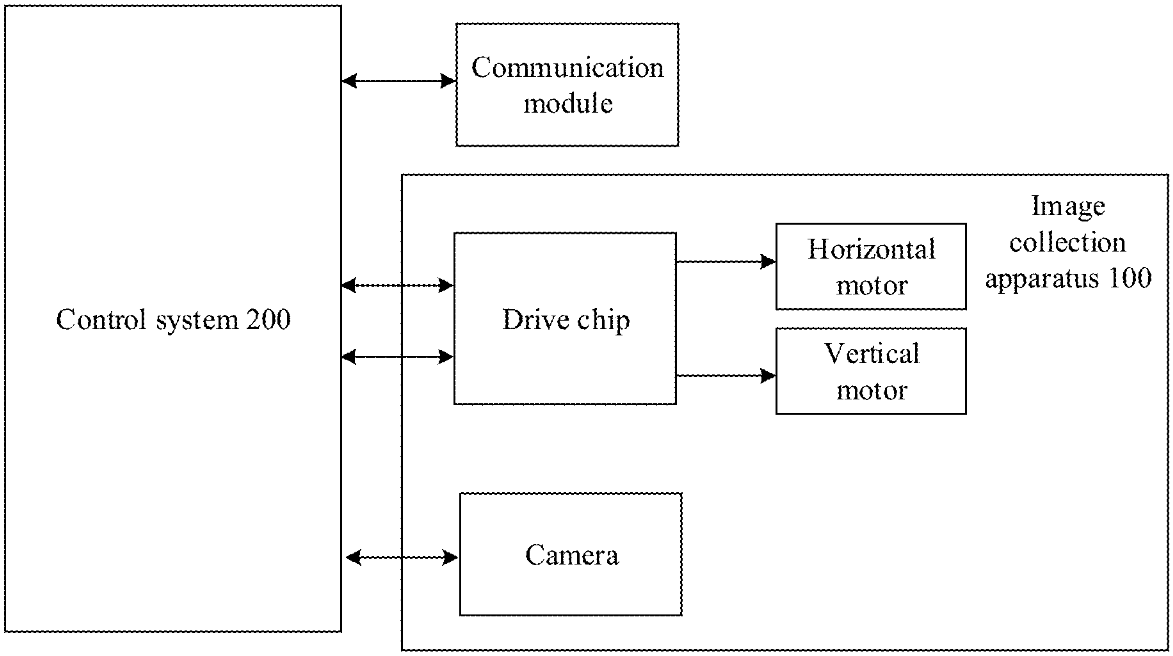
FIG. 2 is a schematic block diagram of a control system according to an embodiment of this application.

To better understand embodiments of this application, the following describes in detail a control system in embodiments of this application with reference to FIG. 2. FIG. 2 is a schematic block diagram of a control system 200 and the image collection apparatus 100. The control system 200 may be electrically connected to the image collection apparatus 100 in FIG. 1, to control a photographing range of a camera in the image collection apparatus 100. For example, a control signal is sent to a drive chip in the rear seat 120. The control signal is used to control a motor (for example, a horizontal motor and a vertical motor) to drive the camera to adjust a lens angle, obtain image data from a memory or an image processor of the image collection apparatus, control the image collection apparatus to store image data, and the like.

As shown in FIG. 2, the control system 200 may include one or more processors. The processor is a circuit having a signal processing capability. In an embodiment, the control system 200 includes a processor having an instruction reading and running capability, for example, a central processing unit (CPU), a microprocessor, a graphics processing unit (GPU), or a digital signal processor (DSP). In another embodiment, the processor may implement a specific function by using a logical relationship of a hardware circuit. The logical relationship of the hardware circuit is fixed or reconfigurable. For example, the processor is a hardware circuit implemented by an application-specific integrated circuit (ASIC) or a programmable logic device (PLD), for example, an FPGA. In the reconfigurable hardware circuit, a process in which the processor loads a configuration document to implement hardware circuit configuration may be understood as a process in which the processor loads an instruction to implement a function corresponding to the instructions. In addition, the processor may be a hardware circuit designed for artificial intelligence (AI), and may be understood as an ASIC, for example, a neural network processing unit (NPU), a tensor processing unit (TPU), or a deep learning processing unit (DPU).

It can be learned that the control system 200 may include one or more processors (or processing circuits), for example, a CPU, a GPU, an NPU, a TPU, a DPU, a microprocessor, a DSP, an ASIC, an FPGA, or a combination of at least two of these processor forms. All or some processors of the control system 200 may be integrated together, or may be implemented independently. In an embodiment, these processors are integrated together and implemented in a form of a system-on-a-chip (SOC).

For example, the control system 200 includes a CPU chip, an AI chip, and the like, or may further include a GPU chip. The AI chip is configured to implement data processing that has a high requirement on image computing power (described in subsequent embodiments), and the GPU chip is configured to implement general-purpose image data processing.

The CPU chip may be configured to implement control on an image collection apparatus, so as to control a photographing angle of a camera, for example, generate and send a control signa. The control signal is used to drive motion of a drive component (for example, a motor) of the camera.

The AI chip may process an image from the image collection apparatus, to obtain a processed digital image signal. The control system 200 may further include a memory, and processed digital image data may be stored in the memory. As an example rather than a limitation, the memory may include, for example, a double data rate (DDR) memory, a flash, and the like. It should be understood that the DDR memory and the flash memory are merely two possible forms of the memory, and should not constitute any limitation on this application. There may be one or more memories, and the memories may be integrated with the processor, or the memory and the processor are separately disposed. In an embodiment, the memory and the processor may be integrated into a same chip, or may be disposed on different chips. A type of the memory, a quantity of memories, and a manner in which the memory and the processor are disposed are not limited in embodiments of this application.

For example, the CPU chip and the AI chip further include an internal memory. The internal memory may be configured to store instructions or code. The CPU chip or the AI chip may implement a function corresponding to the instructions or the code by executing the instruction or the code stored in the internal memory. As an example rather than a limitation, the internal memory may, for example, include a high-speed random access memory, or may include a non-volatile memory like at least one disk storage device, a flash storage device, or a universal flash storage (UFS).

Alternatively, the CPU chip or the AI chip may not include the foregoing internal memory, and a function corresponding to the instructions or the code is implemented by reading instructions or code stored in an external memory. The external memory may be located outside the CPU chip or the AI chip, and exist independently. This is not limited in this application.

An embodiment of this application further provides a communication module. The communication module may be located in the image collection apparatus 100, or located in the control system 200, or independent of the image collection apparatus 100 and the control system 200.

A vehicle, the image collection apparatus 100, or the control system 200 may communicate with another terminal device (for example, a mobile terminal like a mobile phone, a tablet computer, or an intelligent wearable device) of a user by using the communication module, or communicate with a remote server (for example, a cloud). The communication module may be configured to send all or a part of processed image data to the terminal device or the server. The communication module may be, for example, a network card, a Bluetooth module, or a wireless fidelity (Wi-Fi) module.

The network card may also be referred to as a network adapter, a network interface card, or the like. The network card is, for example, a wireless network card, and may communicate with a terminal device or a remote server based on a cellular communication technology.

The Bluetooth module or the wireless fidelity module is a short-range wireless communication technology. When a user (for example, a vehicle owner) is in a communication range, the image collection apparatus 100 may communicate with a terminal device (for example, a mobile terminal like a mobile phone, a tablet computer, or an intelligent wearable device) of the user by using the communication module.

It should be understood that a specific form of the communication module listed above is merely an example, and should not constitute any limitation on this application. A specific form of the communication module and a manner of communication between the image collection apparatus and the terminal device or the remote server are not limited in this application.

In addition, communication between the image collection apparatus 100 and the control system 200 may be implemented based on in-vehicle wired communication, or may be implemented based on wireless communication, for example, short-range communication like a Bluetooth module or a wireless fidelity (Wi-Fi) module. This is not limited in this application.

FIG. 3 is a schematic diagram of a possible installation position of a camera on a vehicle according to an embodiment of this application. As shown in FIG. 3, the camera may be installed on a front of the vehicle, a rear of the vehicle, or a left or right rearview mirror. When the camera is installed on the rearview mirror, the camera may be installed inside or outside the rearview mirror. FIG. 3 is merely an example of the possible installation position of the camera on the vehicle in this embodiment of this application. For better understanding, in addition to the position shown in FIG. 3, the camera may be installed at another position of the vehicle, for example, any position of a side vehicle body between a front windshield and a rear windshield, for example, a vehicle body frame, a vehicle window, or a vehicle door. This is not limited in embodiments of this application.

In an embodiment, the image collection apparatus 100 and the control system 200 are disposed on the vehicle. The image collection apparatus 100 may change a spatial position of the camera of the image collection apparatus 100 under control of the control system 200, or change a photographing angle of the camera of the image collection apparatus 100, so that an included angle between a lower side line of a body side of the vehicle and a vertical direction is less than a first angle. In a scenario like scratching, the body side of the vehicle is most likely to be damaged by the outside. Therefore, an image collection apparatus with an adjustable photographing angle may be used to expand an effective photographing range of the image collection apparatus, and reduce a monitoring blind area. In addition, angle control enables the included angle between the lower side line of the body side of the vehicle and the vertical direction to be less than the first angle, so that the body side is within the photographing range, and a problem that key information (for example, a face of a perpetrator or a feature of a hit-and-run vehicle) cannot be clearly identified due to edge distortion of the photographing range is reduced.

FIG. 4 is a schematic flowchart of a data collection method according to an embodiment of this application. The method shown in FIG. 4 may be applied to a scenario in which a vehicle is in a parking lot, to detect an environment around the vehicle, and execute a corresponding instruction based on detected data, so as to protect the vehicle. The method shown in FIG. 4 may be performed by an in-vehicle system of the vehicle. The in-vehicle system may be, for example, an in-vehicle chip or a vehicle-mounted apparatus (for example, an in-vehicle infotainment, a vehicle-mounted computer, or a sensor having a data processing function). For example, the control system 200 shown in FIG. 2 controls the image collection apparatus 100 shown in FIG. 1 to perform the method. For example, the control system controls a sensor of the vehicle to detect the environment around the vehicle. The sensor herein includes the image collection apparatus 100 shown in FIG. 1, and may also include another sensor like a radar sensor. The sensor sends detection data of the environment around the vehicle to the control system. The control system performs corresponding processing on the detection data, and sends a corresponding instruction based on the detection data, for example, controls the image collection apparatus 100 to adjust an angle and/or a detection frequency. In an embodiment, the control system 200 may be connected to a drive chip of the image collection apparatus 100 by using an interface, and the drive chip may drive adjustment of a photographing angle of a camera of the image collection apparatus 100. The method shown in FIG. 4 includes operation 401 and operation 402, which are separately described below.

Operation S401: Send a control instruction (which may be referred to as first control instruction to distinguish the following other control instructions) to an image collection apparatus, where the control instruction is used to control a photographing angle of the image collection apparatus, so that in an image collected by the image collection apparatus, an included angle between a lower side line of a body side of the vehicle and a vertical direction is less than a first angle.

Operation S402: Obtain image data from the image collection apparatus.

In the conventional technology, a common camera is used to monitor the environment around the vehicle, and consequently, a monitoring blind area is large. Therefore, during monitoring of a scenario like scratching, a face of a perpetrator is often not photographed. However, in this embodiment of this application, the image collection apparatus and the control system are disposed on the vehicle. In this case, the image collection apparatus may change a spatial position of the camera of the image collection apparatus under control of the control system, or change the photographing angle of the camera of the image collection apparatus, so that the monitoring blind area can be reduced. In addition, the image collection apparatus may change the photographing angle under the control of the control system, to further flexibly adjust the photographing angle, improve monitoring flexibility, and reduce key information omission. In addition, a camera with a larger field of view (FOV) and a smaller blind area, for example, a fisheye surround-view camera, may be used to further reduce the monitoring blind area. In addition, when the included angle between the lower side line of the body side of the vehicle and the vertical direction is less than the first angle by controlling the photographing angle, a problem that an image photographed by this type of camera may be greatly distorted at an edge can be reduced. In this way, accuracy of identifying key information can be improved, for example, in the scenario like scratching, the face of the perpetrator or the feature of the hit-and-run vehicle can be clearly photographed.

The image collection apparatus may be installed on a rearview mirror (a left rearview mirror and/or a right rearview mirror) of the vehicle, or installed on a vehicle body between a point A and a point B shown in FIG. 3, for example, a vehicle body frame, a vehicle window, or a vehicle door of the vehicle. The point A and the point B are, for example, positions of a headlight and a rearlight, or positions of a front windshield and a rear windshield.

In some embodiments of this application, the image collection apparatus is, for example, the image collection apparatus shown in FIG. 1. The drive component and the camera are integrated together and installed on the vehicle. In some other embodiments, the drive component of the image collection apparatus may be disposed separately from the camera, for example, may be a vehicle component carrying the camera. A change of a spatial position (for example, rotation) of the vehicle component carrying the camera drives adjustment of the photographing angle of the camera. For example, in FIG. 3, the cameras are installed on the left and right rearview mirrors of the vehicle, and the left and right rearview mirrors may rotate, so that the cameras mounted on the left and right rearview mirrors may be driven to rotate. In this way, in this embodiment of this application, a common camera that cannot be rotated may be reused, to reduce implementation costs. In addition, aftermarket installation may be implemented on an existing vehicle, so that implementation costs of vehicle monitoring can be greatly reduced. The camera includes, for example, a fisheye camera, a linear camera, or an electronic rearview mirror.

The first angle is, for example, any value within [0, 30° ]. For example, in an embodiment, the lower side line of the body side of the vehicle is in a vertical direction in the image photographed by the camera, that is, the first angle is 0. In another embodiment, the included angle between the lower side line of the body side of the vehicle in the image photographed by the camera and the vertical direction is within 15°. The first angle may be preset in the control system, and a value range of the first angle is as described above. Alternatively, the first angle may be set by the user in a process of using the vehicle. Alternatively, the first angle may be analyzed and continuously optimized by the control system based on image data collected by the camera, to obtain a maximum optical angle value as the first angle.

The data collection method in this embodiment of this application may be applied to a parking lot scenario. After a vehicle is parked and the vehicle is locked, the control system may enable monitoring on the vehicle based on enabling of a monitoring mode. The method further includes: receiving a first instruction, and sending the first control instruction to the image collection apparatus based on the first instruction, where the first control instruction is used to control the photographing angle of the camera to be the first angle, so that in the image collected by the camera, the included angle between the lower side line of the body side of the vehicle and the vertical direction is less than the first angle. The first instruction may be generated based on enabling of a first mode of the vehicle. The first mode is, for example, a sentinel mode, or an intelligent parking monitoring mode. An in-vehicle infotainment system may provide a selection way for the user to enable the first mode. For example, when the user parks a vehicle, the user is prompted, by using a voice prompt, whether to enable the first mode, and when it is detected that the user replies to enable the first mode by using a voice, the first mode is enabled. For another example, a vehicle-mounted display apparatus is used to prompt, by using an image, whether to enable the first mode by the user, and when it is detected that the user taps to enable the first mode, the first mode is enabled. For another example, a manner of enabling the first mode by using a button on a steering wheel or another position (for example, a center console) of the vehicle is provided for the user, so that when it is detected that the user presses the button, the first mode is enabled. For another example, through gesture recognition, the first mode is enabled when a gesture that the user selects to enable the first mode is detected. In addition, in another embodiment, the first mode may be automatically enabled after the vehicle is parked. For example, the first mode is automatically enabled after a vehicle locking signal is detected. In this way, after the vehicle receives the vehicle locking signal, the vehicle is automatically monitored. The control system sends control instructions to the image collection apparatus based on the first instruction, so that the drive component of the image collection apparatus drives adjustment of the photographing angle of the camera. In this case, the included angle between the lower side line of the body side of the vehicle and the vertical direction in the image photographed by the camera is less than the first angle. In the scenario like scratching, the body side of the vehicle is most likely to be damaged by the outside. Therefore, it is particularly important to monitor the vehicle body. By using the foregoing method, the entire body side may be within a photographing range of the camera. For a linear camera, an effective photographing range of the linear camera may be expanded. For a fisheye surround-view camera, a problem that effective photographing cannot be performed due to edge distortion of the photographing range may be reduced.

After the camera is adjusted to the first angle, the camera is started up to detect an environment around the vehicle. The detection may be photographing (photographing or video recording) on the environment around by using the camera.

In an implementation, a photographing frequency/detection frequency of the camera in this case may be set to a first frequency. For example, the camera is set to take a photo every 1 second, or the camera is set to record a video every 1 second, and a recording length of the video is 1 second.

The first frequency and photographing time may be preset in the control system, or may be set by a user according to a requirement of the user, or may be set by a remote server (for example, a cloud). This is not limited in embodiments of this application.

The first frequency may be controlled by the control system by using a control instruction, and the control system may control the photographing frequency of the camera to be the first frequency by using the first control instruction. In this way, the photographing frequency may be controlled while the photographing angle is controlled, so that control efficiency is improved. Alternatively, the control system may control the photographing frequency by using a control instruction different from the first control instruction.

Further, when an object (for example, a pedestrian or another vehicle) enters the first range around the vehicle, the control system may control the camera to track and detect the object until the object leaves the first range; and/or the control system may control the photographing frequency of the camera to increase, to reduce key information omission. For example, the photographing frequency is controlled to be a second frequency, and the second frequency is greater than the first frequency. The first range may be a sensing range of the sensor, or may be a preset range.

In an implementation, the control system obtains sensor data from the sensor, and determines, based on the sensor data, that an object enters the first range around the vehicle. The sensor is a sensor (for example, another image sensor, a radar sensor (for example, an ultrasonic radar, a millimeter wave radar, or a centimeter wave radar), or a vibration sensor) disposed on the vehicle except the foregoing image collection apparatus, or the sensor is the foregoing image collection apparatus.

For example, when an object exists in the first range of the vehicle, the photographing angle of the camera of the image collection apparatus is adjusted based on a position of the object, so that the image collection apparatus tracks and detects the object, that is, controls the photographing angle of the camera to be adjusted with the object.

Figure 5:
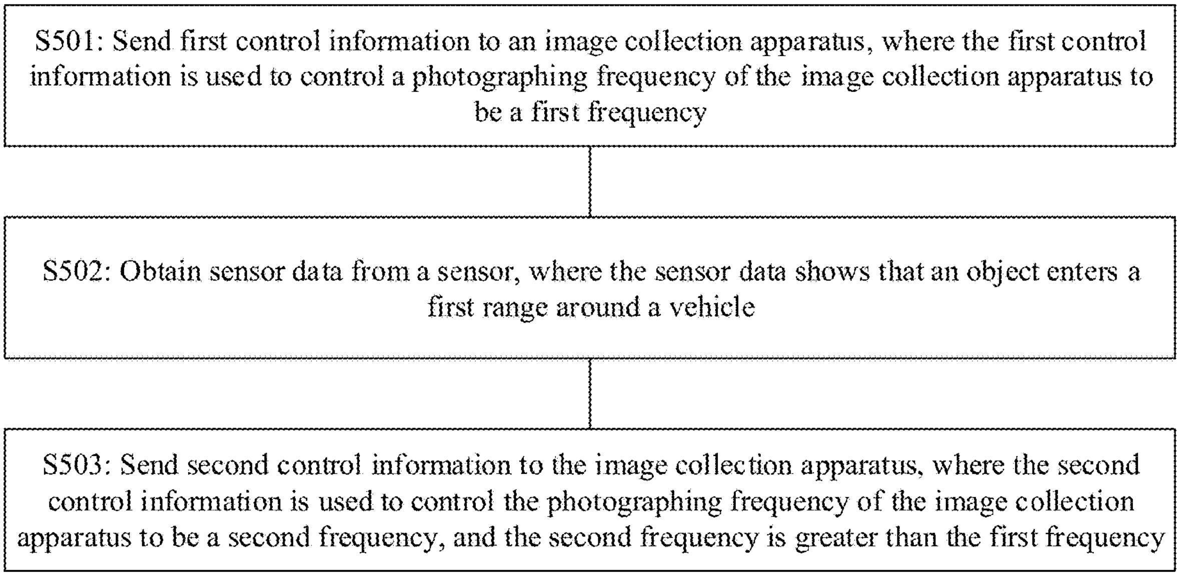
FIG. 5 is a schematic flowchart of another data collection method according to an embodiment of this application.

The detected data is image data (including a photo taken or a video recorded in the environment around) of the environment around the vehicle. An image processor of the image collection apparatus may process the collected image, and provide a processed image to the control system. The processor in the control system identifies the image data. When it is identified that an object in the environment around the vehicle is approaching and is within the first range around the vehicle, an angle of the camera is adjusted based on a position of the object, so that the camera detects the object. In addition, in an existing monitoring technology in a parking lot scenario (for example, a sentinel mode), a camera is always on, which is extremely power-consuming. An embodiment of this application provides a data collection method, used for data collection around a vehicle, and executed by a control system disposed on the vehicle. As shown in FIG. 5, the method includes the following operations.

Operation S501: Send first control information (which may also be referred to as control instruction, and is referred to as first control information for distinguishing from control instruction in other embodiments, where the first control information may be the first control instruction in the foregoing embodiment) to an image collection apparatus, where the first control information is used to control a photographing frequency of the image collection apparatus to be a first frequency.

Operation S502: Obtain sensor data from a sensor, where the sensor data shows that an object enters a first range around the vehicle, and a description of the sensor is the same as that in the foregoing embodiments.

Operation S503: Send second control information (which may also be referred to as control instruction, and is also referred to as third control instruction for distinguishing from the control instruction in other embodiments) to the image collection apparatus, where the second control information is used to control the photographing frequency of the image collection apparatus to be a second frequency, and the second frequency is greater than the first frequency.

The control system controls a camera to sense an environment around the vehicle at a low frequency, to implement a low-frequency and low-power-consumption power-on state. When an object approaches the vehicle, the camera is controlled to sense the environment around the vehicle at a higher frequency, to reduce a possibility of key information omission. In this way, power consumption and a requirement for monitoring key information can be balanced, to improve monitoring effect. This embodiment may be combined with other embodiments, so that the monitoring effect is improved.

In some embodiments of this application, when the control system detects a possibility that a dangerous situation like scratching occurs around the vehicle, the control system stores image data within a period of time, for example, stores image data within a period of time (for example, 5 minutes) before and after a moment at which the dangerous situation is detected, in a memory, for example, a memory in the control system, or an in-vehicle infotainment hard disk or a USB flash drive; and/or the control system uploads image data to a remote server (for example, a cloud) or another terminal device (for example, a mobile phone or a computer) of a user by using a communication module. Alternatively, in another embodiment, to save storage space or transmission resources of the vehicle, the control system obtains key information, for example, feature information of an object, like a face or a license plate by using image data, and stores or uploads the key information. The image data or key information may be security-protected. Only when an accident occurs, the data or key information can be obtained and used by a person who has the right to obtain the data or key information.

The control system can determine whether there is a possibility that a dangerous situation occurs by using a distance between the object and the vehicle. In this case, the method further includes: receiving image data from the image collection apparatus; and when a distance between the object in the image data and the vehicle is less than a first distance, triggering saving and/or sending of the image data, or triggering saving and/or sending of key information in the image data.

In an implementation, an interfering object may be excluded based on an environment factor, to reduce misjudgment of the foregoing possibility of occurrence of the dangerous situation. In other words, the foregoing object is determined as a non-interfering object, and the non-interfering object is tracked and photographed. In other words, a photographing angle of the camera is controlled to be adjusted with the non-interfering object. When it is determined that a distance between the non-interfering object and the vehicle is less than the first distance, saving and/or sending of the image data are/is triggered, or saving and/or sending of key information in the image data are/is triggered. The environment factor is information about an interfering object in a parking environment of the vehicle.

In this case, the object in the foregoing embodiment is a non-interfering object. In an implementation, the object in the image data is detected based on a parking position and an interfering object type, to determine that the object is a non-interfering object. The interfering object type includes one or more of a shade, a branch, a shadow, and a light spot. For example, when it is determined that the parking position is near a tree, as an illumination angle changes, the shade may gradually approach the vehicle, or the branch may sway in the wind to gradually approach the vehicle. However, because the parking position is near a tree, motion of the shade or the branch should be normal. In this case, it may be determined that the shade and the branch are interfering objects, and therefore, an instruction does not need to be made based on the shade and the branch. When it is determined that the parking position is an underground garage, because no shade or branch appears in the underground garage, if it is detected that a shade or a branch approaches (for example, a perpetrator uses a branch to scratch a vehicle), it is abnormal. In this case, the shade and the branch are non-interfering objects, and an instruction is made based on the shade and the branch. In an implementation process, technologies such as an image segmentation algorithm and a moving target detection algorithm may be used to determine whether an object in obtained image data is a non-interfering object. This is not limited in this application.

In an embodiment, after it is determined that the object in the image is a non-interfering object, it is determined whether the object is approaching the vehicle and is within the first range around the vehicle. Specifically, a position of the object may be determined by using one or more of a frame difference algorithm, a deep learning detection algorithm, an image segmentation algorithm, or the like. In addition, another sensor (for example, a radar sensor) on the vehicle may also be used to detect and track the object, to determine the position of the object. Specifically, when the object moves close to the radar sensor, a wavelength of a reflected wave of the object becomes shorter. When the object moves away from the radar sensor, a wavelength of a reflected wave of the object becomes longer. A higher movement speed of the object indicates a larger wavelength change. In this way, the position of the object may be obtained by calculating a delay from time when an antenna transmits a radio wave to time when the antenna receives a reflected wave. A speed of the object may be calculated by comparing a wavelength change (Doppler frequency shift) of the transmitted wave and the reflected wave, to determine whether the object is approaching the vehicle. The first range may be a preset range, and may be set before a system is delivered from a factory, or may be set by a user according to a requirement of the user. For example, a value range of the first range may be 0 to 3 meters around the vehicle.

In an embodiment, when it is determined that the object is a non-interfering object, and the object enters the first range, an angle of the camera is adjusted based on the position of the object, so that the camera detects the object. Specifically, the angle of the camera is adjusted, so that the object is located at a position close to a middle position of a picture photographed by the camera. In this way, a full view of the object can be photographed as completely as possible. In addition, when the camera is a fisheye camera, distortion caused because the object is located at an edge of the picture is reduced. Then, the angle of the camera is adjusted in real time based on the position of the object, to follow the object for video recording. In this way, when a person is excessively close to the vehicle, the angle of the camera is adjusted, so that the person is close to the middle position of the photographed picture. In addition, the photographing angle of the camera is adjusted in real time based on a movement position of the person, to track and photograph the person. In this way, a behavior of the person on the vehicle may be recorded.

In another embodiment, when it is detected that an object exists in the first range, it may be determined whether the object is an interfering object or a non-interfering object. For the non-interfering object, the camera may be used to detect, track, and report the object. The interference object may be ignored, and tracking and reporting processes are not triggered. In this way, a probability that the interfering object in the environment causes an incorrect prompt to the user can be reduced, and accuracy of risk identification can be improved.

In addition to the camera, the data collection method in this embodiment of this application further includes detecting the object in the environment with reference to another sensor of the vehicle. Specifically, the first control information is sent to a first sensor, where the first control information is used to control a detection frequency of the first sensor to be the first frequency. Sensor data is obtained from the first sensor, where the sensor data shows that an object enters the first range around the vehicle. The second control information is sent to a second sensor, where the second control information is used to control a detection frequency of the second sensor to be the second frequency. The first sensor may be the same as, partially the same as, or different from the second sensor. Each of the first sensor and the second sensor includes one or more of a camera, a radar sensor, and a vibration sensor. When it is detected by the first sensor and/or the second sensor that the object enters the second range, third control information is sent to a third sensor, where the third control information is used to control a detection frequency of the third sensor to be a third frequency. The third sensor may be the same as, partially the same as, or different from the first sensor and the second sensor, and the second range is less than the first range. The second range herein is a preset range, which may be set by research and development personnel before delivery of a system, or may be set by the user according to a requirement of the user. For example, a value range of the second range may be 0 to 1 meter around the vehicle. The following describes the method in FIG. 5 by using an example with reference to FIG. 6 and FIG. 7.

Figure 6:
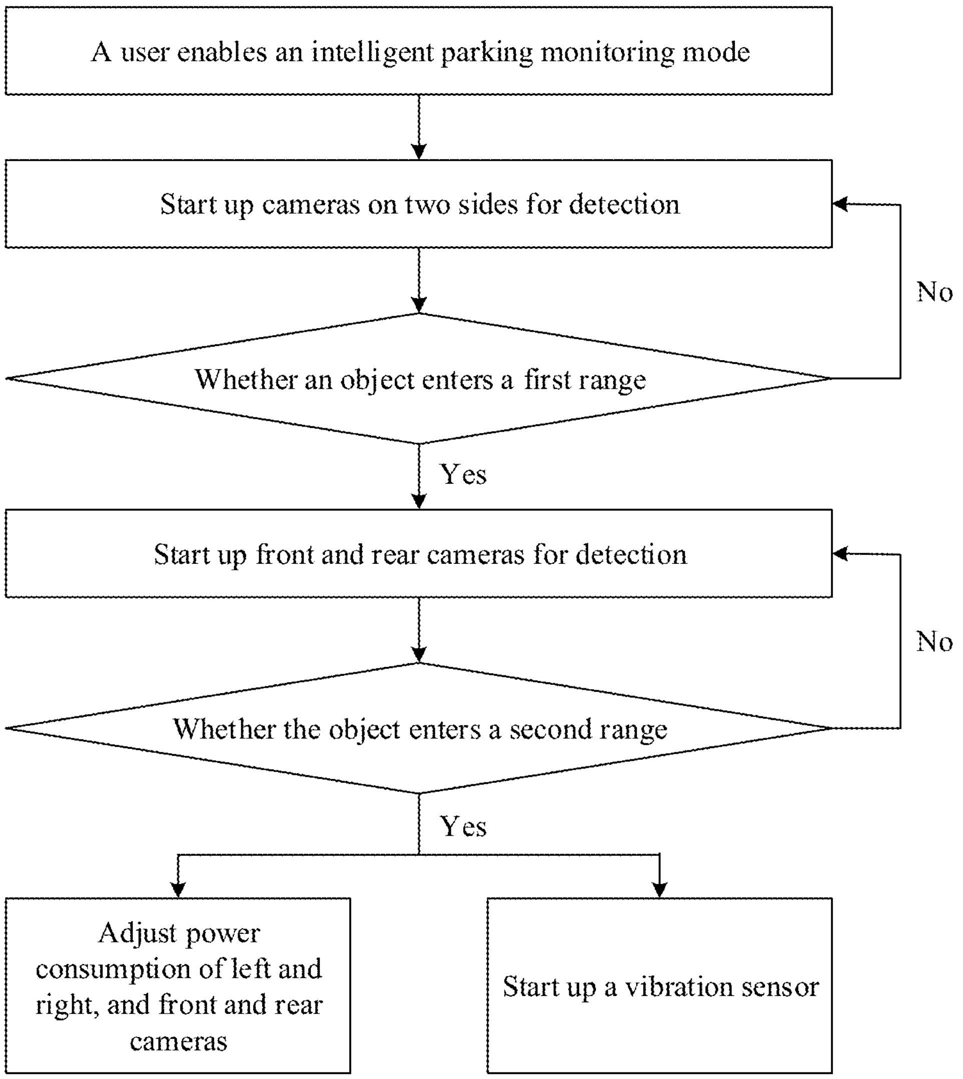
FIG. 6 is a schematic flowchart of still another data collection method according to an embodiment of this application.

FIG. 6 is a schematic flowchart of a data collection method according to an embodiment of this application. The following describes the method. To save energy, the vehicle protection method in this embodiment of this application may be set to be used only when a user enables a sentinel mode and an intelligent parking monitoring mode. As shown in FIG. 6, after the user parks a vehicle, whether to enable the intelligent parking monitoring mode may be displayed on an in-vehicle infotainment interface, or the user may be queried by voice whether to enable the intelligent parking monitoring mode, or the user may set to enable the intelligent parking monitoring mode by default. When the user enables the intelligent parking monitoring mode, after the user parks and locks the vehicle, the control system sends the first control information to cameras on two sides of the vehicle, to start up the cameras on the two sides of the vehicle, for example, a left camera 1 and a right camera 1 or a left camera 2 and a right camera 2 in FIG. 3, and adjust angles of the cameras, so that a lower side line of a body side of the vehicle is in a vertical direction in an image photographed by the camera. In this case, the cameras are in a low power consumption mode, and a photographing frequency is the first frequency, for example, a photo of an environment around the vehicle is taken every 1 second. When detecting, based on the images obtained by the cameras on the two sides, that an object enters the first range around the vehicle, for example, a range of 3 meters around the vehicle, the control system sends the second control information to front and rear cameras of the vehicle, to start up the front and rear cameras of the vehicle, for example, the vehicle-front camera and the vehicle-rear camera in FIG. 3, and adjust angles and detection frequencies of the cameras on the two sides and the front and rear cameras in real time. In this case, detection frequencies of the cameras on the two sides and the front and the rear cameras are both the second frequency, and the second frequency is greater than the first frequency. In this way, both the cameras on the two sides and the front and rear cameras track and record the object. This can ensure that the object can be detected by a camera regardless of a direction in which the object moves to the vehicle. The object is detected based on the cameras on the two sides and the front and rear cameras, to determine whether the object enters the second range of the vehicle. The second range is less than the first range. For example, the second range is 0.03 meters around the vehicle. If it is determined that the object enters the second range of the vehicle, detection frequencies of the cameras on the two sides and the front and rear cameras are adjusted based on a specific position of the object. For example, when the object is within a range of 0.03 meters of a left side of the vehicle body, because the right camera and the front and rear cameras of the vehicle cannot detect the object, the third control information may be sent to the right camera and the front and rear cameras of the vehicle, to reduce detection frequencies of the right camera and the front and rear cameras of the vehicle, so that the right camera and the front and rear cameras of the vehicle no longer track and record the object, but are adjusted to continue to detect the environment around at a frequency of taking one photo every 1 second. However, the left camera of the vehicle can photograph the object. In this case, the left camera continues to track and record the object. When the object enters the second range of the vehicle, the vibration sensor may be further started up. If the object touches the vehicle and is detected by the vibration sensor, an alarm is triggered to generate an alarm.

Figure 7:
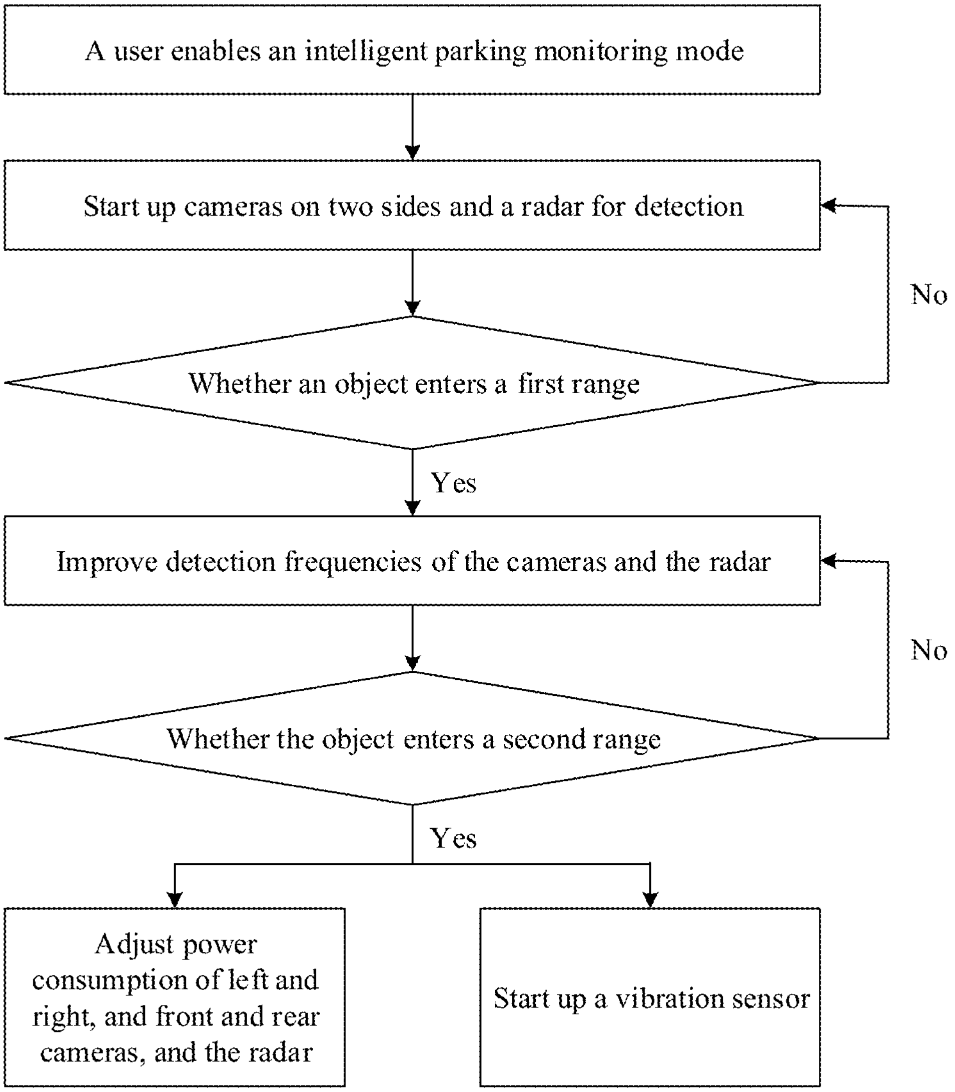
FIG. 7 is a schematic flowchart of still another data collection method according to an embodiment of this application.

FIG. 7 is a schematic flowchart of another data collection method according to an embodiment of this application. The following describes the method. When a user enables an intelligent parking monitoring mode, after the user parks and locks a vehicle, the control system sends the first control information to cameras on two sides of the vehicle and a radar sensor, to start up the cameras on the two sides of the vehicle and the radar sensor of the vehicle. There may be one or more radar sensors on the vehicle. When there is only one radar sensor on the vehicle, the radar sensor is started up. When there are a plurality of radar sensors on the vehicle, the radar sensors near the two sides of the vehicle are started up. In this case, the cameras on the two sides of the vehicle and the radar sensor are in a low power consumption mode, and a detection frequency is the first frequency. For example, the camera takes a photo of an environment around the vehicle every 1 second, and the radar sensor transmits a radio wave at a frequency of 5 hertz (Hz). When the camera detects that a non-interfering object is approaching around the vehicle, and the radar sensor detects that the object enters the first range around the vehicle (for example, 3 meters around the vehicle), the control system sends the second control information to the cameras on the two sides of the vehicle and the radar sensor, and adjusts detection frequencies of the cameras on the two sides of the vehicle and the radar. Specifically, the detection frequencies of the cameras on the two sides of the vehicle and the radar are improved, for example, angles of the cameras on the two sides are adjusted to track and record the object, and the frequency of the radio wave transmitted by the radar sensor is improved to 60 Hz. When the radar sensor determines that the object enters the second range (for example, 0.03 meters around the vehicle) around the vehicle, and further obtains a position of the object, the control system sends the third control information to the cameras on the two sides, the front and rear cameras, and the radar sensor, and adjusts detection frequencies of the cameras on the two sides, the front and rear cameras, and the radar sensor in real time based on the position of the object. For example, when the object is within a range of 0.03 meters of the rear of the vehicle, the vehicle-rear camera is started up, and an angle of the vehicle-rear camera is adjusted to track and record the object. In this case, because the cameras on the two sides of the vehicle and the vehicle-front camera cannot detect the object, power consumption of the cameras on the two sides of the vehicle and the vehicle-front camera may be reduced, so that the cameras on the two sides of the vehicle and the vehicle-front camera no longer track and record the object, but are adjusted to continue to detect the environment at a frequency of photographing one photo every 1 second. In addition, the frequency of transmitting a radio wave by the radar sensor may be further improved, and the position of the object is determined in real time, to adjust detection frequencies of the cameras on the two sides of the vehicle and the front and rear cameras in real time based on the position of the object. When the object enters the second range of the vehicle, the control system may further send the third control information to the vibration sensor, to start up the vibration sensor. If the object touches the vehicle and is detected by the vibration sensor, an alarm is triggered to generate an alarm.

Based on the methods shown in FIG. 6 and FIG. 7, at the beginning, only the cameras on the two sides of the vehicle or the radar sensor is started up to detect an environment, and the detection frequency is low, so that energy can be saved. Then, another sensor is started up in a timely manner based on the position of the detected object, or a detection frequency of the started-up sensor is improved, to ensure comprehensive detection of an object that may be dangerous. In addition, power consumption of an unnecessary sensor is reduced, to save energy.

It should be understood that FIG. 6 and FIG. 7 are merely examples of detecting an object in the environment around the vehicle based on a rotatable camera and the first sensor, and should not constitute a limitation on this embodiment of this application. In actual application, a plurality of sensors listed in FIG. 6 and FIG. 7 may be combined to detect the object in the environment around the vehicle, or the object in the environment around the vehicle may be detected based on the rotatable camera and another sensor.

After the object in the environment is tracked and recorded based on the camera, the method in this embodiment of this application further includes: screening a video obtained through video recording, and selecting a valid video from the video for storage, where the valid video is a video clip of the object that is clearly photographed. For example, when the object can be clearly detected, the video clip is stored until the object does not appear in the video for a specific period of time, for example, does not appear in the video for more than one minute. Alternatively, when the valid video clip is excessively long, a video clip of preset duration may be selected for storage, for example, a 10-minute video clip of the valid video clip is stored. Further, the obtained valid video may be screened to obtain a clear multi-frame image including the object, then processing is performed on the clear multi-frame image to obtain a processed multi-frame image, and finally the processed multi-frame image is sent to the user. Specifically, the processed multi-frame image may be sent to a mobile phone, a mailbox, or the like associated with the user. In this way, the user can be notified of a vehicle status in a timely manner, and the user can view and save the vehicle status conveniently. Then, the obtained video is deleted to reduce memory usage. The processing of the clear multi-frame image includes image super-resolution processing, to further improve definition of the clear multi-frame image. The image super-resolution processing is a process of reconstructing a high-resolution image from a given low-resolution image by using a specific algorithm and processing process based on related knowledge in fields such as digital image processing and computer vision. This can overcome or compensate for obvious problems such as image blur, low quality, and an insignificant region of interest that are caused by a limitation of an image collection system or an image collection environment.

The data collection method in this embodiment of this application is used to monitor the environment around the vehicle. An existing linear camera, an existing non-linear camera (for example, a fisheye surround-view camera), and the like may be reused, so that a new camera does not need to be developed, and costs are reduced. In addition, a full view of the object can be effectively photographed, a blind area can be reduced, a problem like distortion can be avoided, and photographing quality is high. According to the data collection method in this embodiment of this application, an object in an environment is detected, to eliminate an interfering object and reduce false positives. According to the data collection method in this embodiment of this application, power consumption of a sensor is adjusted in real time based on the position of the object, to avoid unnecessary energy waste. In addition, according to the data collection method in this embodiment of this application, the obtained video is processed in a timely manner and then the video is deleted, so that memory occupation is reduced.

The foregoing describes in detail the data collection method in embodiments of this application with reference to the accompanying drawings. The following describes a control apparatus in embodiments of this application. It should be understood that the control apparatus in embodiments of this application can perform operations of the data collection method in this application. The following properly omits a repeated description when describing the control apparatus in embodiments of this application.

Figure 8:
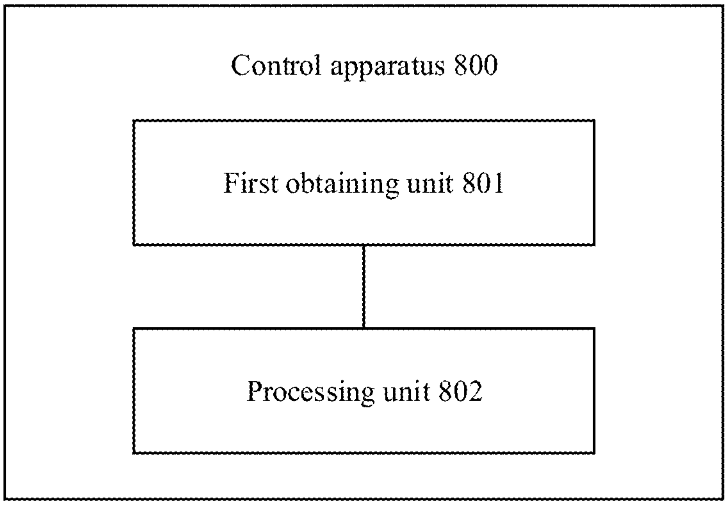
FIG. 8 is a schematic block diagram of a control apparatus according to an embodiment of this application.

An embodiment of this application further provides an apparatus for implementing any one of the foregoing methods. For example, the apparatus includes units configured to implement operations performed by a data collection system in any one of the foregoing methods. For example, FIG. 8 is a schematic block diagram of a control apparatus according to an embodiment of this application. The control apparatus may be a terminal, for example, an in-vehicle system of a vehicle. The in-vehicle system may be, for example, a vehicle-mounted apparatus (for example, an in-vehicle infotainment, a vehicle-mounted computer, or a sensor having a data processing function). For example, the control system 200 shown in FIG. 2 may alternatively be a chip inside the terminal, for example, an in-vehicle chip. As shown in FIG. 8, the control apparatus includes a first obtaining unit 801 and a processing unit 802, which are briefly described below.

The processing unit 802 is configured to send first control instruction to an image collection apparatus. The first control instruction is used to control a photographing angle of the image collection apparatus, so that in an image collected by the image collection apparatus, an included angle between a lower side line of a body side of a vehicle and a vertical direction is less than a first angle.

The first obtaining unit 801 is configured to obtain image data from the image collection apparatus.

The first obtaining unit 801 may be specifically a data interface of a control apparatus, and is configured to connect the control apparatus to a sensor on the vehicle, and obtain corresponding data from the sensor on the vehicle. Alternatively, in some cases, the first obtaining unit 801 may be a sensor on the vehicle, for example, the image collection apparatus herein, and directly obtains detection data of an environment around the vehicle. An included angle between the lower side line of the body side of the vehicle and the vertical direction in the image photographed by the image collection apparatus is less than the first angle, that is, the included angle between the lower side line of the body side of the vehicle and the vertical direction in the image photographed by the first obtaining unit 801 is less than the first angle.

The first angle processing unit 802 may be a processor in the control apparatus, for example, the control system 200 in FIG. 2. The control system 200 is connected to one or more memories, a drive chip, and a camera through an interface, to control the sensor on the vehicle to execute a corresponding instruction, for example, control the image collection apparatus on the vehicle to adjust an angle to track and detect an object.

In some embodiments, a control apparatus 800 further includes: a second obtaining unit, configured to obtain a first instruction, where the first instruction is generated in response to enabling of a first mode of the vehicle. The processing unit 802 is configured to send the first control instruction to the image collection apparatus based on the first instruction, where a first control instruction is used to control the photographing angle of the image collection apparatus to be the first angle, so that in the image collected by the image collection apparatus, the included angle between the lower side line of the body side of the vehicle and the vertical direction is less than the first angle.

In some embodiments, the first obtaining unit 801 is further configured to obtain sensor data from a sensor, where the sensor is a sensor other than the image collection apparatus disposed on the vehicle or is the image collection apparatus. The processing unit 802 is further configured to determine, based on the sensor data, that an object enters a first range around the vehicle.

In some embodiments, the processing unit 802 is further configured to send third control instruction to the image collection apparatus, where a third control instruction is used to control a photographing frequency of the image collection apparatus to be a second frequency, and the second frequency is greater than a first frequency.

In some embodiments, the processing unit 802 is further configured to control the photographing angle of the image collection apparatus to be adjusted with the object.

In some embodiments, the first obtaining unit 801 is further configured to receive image data from the image collection apparatus. The processing unit 802 is further configured to: when a distance between the object in the image data and the vehicle is less than a first distance, trigger saving and/or sending of the image data, or trigger saving and/or sending of key information in the image data.

In some embodiments, the processing unit 802 is further configured to determine, based on an environment factor by performing image segmentation on the image data, that the distance between the object and the vehicle is less than the first distance.

It should be understood that the control apparatus shown in FIG. 8 may be configured to implement the data collection method shown in FIG. 4. The first obtaining unit 801 is configured to implement operation 402, and the processing unit 802 is configured to implement operation 401. For specific operations, refer to the foregoing description of FIG. 4. For brevity, details are not described herein again in this application.

It should be further understood that the control apparatus in this embodiment of this application may be implemented by software, for example, a computer program or instructions having the foregoing functions, and the corresponding computer program or the corresponding instructions may be stored in a memory inside the terminal. A processor reads the corresponding computer program or the corresponding instructions in the memory to implement the foregoing functions. Alternatively, the control apparatus in this embodiment of this application may be implemented by hardware. The processing unit 802 is a processor (for example, an NPU, a GPU, or a processor in a system chip), and the first obtaining unit 801 is a data interface. Alternatively, the control apparatus in this embodiment of this application may be implemented by a combination of a processor and a software module. Specifically, the obtaining unit 801 may be an interface circuit of the processor, a camera or a radar sensor of the terminal, or the like. For example, the camera or the radar sensor of the terminal sends the obtained t information about the environment around the vehicle to the interface circuit of the processor.

The control apparatus 800 shown in FIG. 8 may be further configured to implement the method shown in FIG. 5. Details are as follows.

The processing unit 802 is configured to send first control information to the image collection apparatus. The first control information is used to control the photographing frequency of the image collection apparatus to be the first frequency.

The first obtaining unit 801 is configured to obtain the sensor data from the sensor. The sensor data shows that an object enters the first range around the vehicle. The sensor is a sensor other than the image collection apparatus disposed on the vehicle or is the image collection apparatus.

The processing unit 802 is further configured to send second control information to the image collection apparatus. The second control information is used to control the photographing frequency of the image collection apparatus to be the second frequency. The second frequency is greater than the first frequency.

In some embodiments, the first control information is further used to control the photographing angle of the image collection apparatus, so that in the image collected by the image collection apparatus, the included angle between the lower side line of the body side of the vehicle and the vertical direction is less than the first angle.

In some embodiments, the processing unit 802 is further configured to send third control information to the image collection apparatus. The third control information is used to control the photographing angle of the image collection apparatus to be adjusted with the object.

It should be understood that the control apparatus shown in FIG. 8 may be configured to implement the data collection method shown in FIG. 5. The first obtaining unit 801 is configured to implement operation 502, and the processing unit 802 is configured to implement operations 501 and 503. The control apparatus shown in FIG. 8 may be further configured to implement the data collection methods shown in FIG. 6 and FIG. 7. For specific operations, refer to the foregoing descriptions of FIG. 6 and FIG. 7. For brevity, details are not described herein again in this application.

Figure 9:
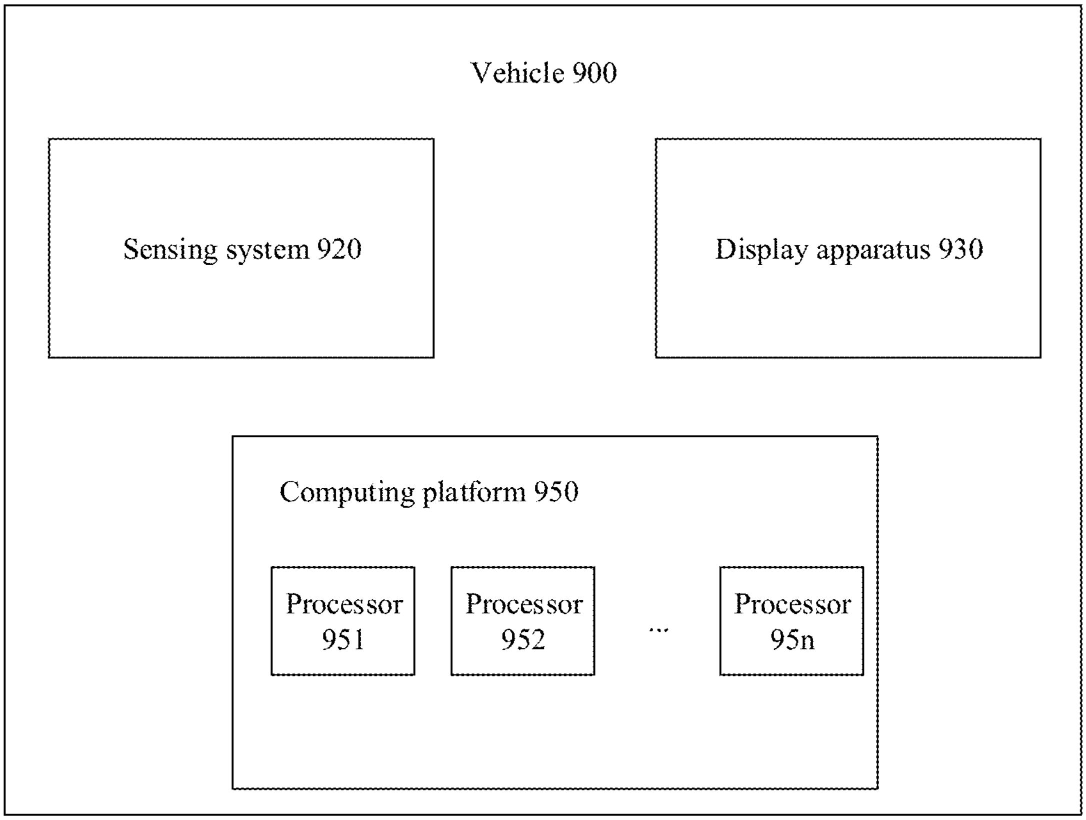
FIG. 9 is a schematic diagram of a structure of a vehicle according to an embodiment of this application.

FIG. 9 is a schematic diagram of a functional block diagram of a vehicle 900 according to an embodiment of this application. The vehicle 900 may monitor, by using the data collection method in this embodiment of this application, an event like a collision or a scratch that may occur after the vehicle is parked, to improve monitoring effect.

The vehicle 900 may include a sensing system 920, a display apparatus 930, and a computing platform 950. The sensing system 920 may include several sensors that sense information about an environment around the vehicle 900. For example, the sensing system 920 may include a positioning system. The positioning system may be a global positioning system (GPS), a BeiDou system, or another positioning system, and one or more of an image collection apparatus, an inertia measurement unit (IMU), a lidar, a millimeter-wave radar, an ultrasonic radar, or a vibration sensor. The sensing system 920 may be configured to collect data around the vehicle 900 in this embodiment of this application.

Some or all functions of the vehicle 900 may be controlled by the computing platform 950. The computing platform 950 may include processors 951 to **95*n* (n is a positive integer). The processor is a circuit having a signal processing capability. In an implementation, the processor may be a circuit having an instruction reading and running capability, for example, a CPU, a microprocessor, a GPU, or a DSP. In another implementation, the processor may implement a specific function by using a logical relationship of a hardware circuit, and the logical relationship of the hardware circuit is fixed or reconfigurable, for example, the processor is a hardware circuit implemented by an ASIC or a PLD, for example, an FPGA. In the reconfigurable hardware circuit, a process in which the processor loads a configuration document to implement hardware circuit configuration may be understood as a process in which the processor loads an instruction to implement functions of some or all of the foregoing units. In addition, the processor may be a hardware circuit designed for artificial intelligence, and may be understood as an ASIC, for example, an NPU, a TPU, or a DPU. In addition, the computing platform 950 may further include a memory. The memory is configured to store instructions. Some or all of the processors 951 to 95*n* may invoke the instructions in the memory to execute the instructions, so as to implement a corresponding function. For example, the processor sends control information to the sensing system 920, to control the sensing system 920** to collect data and store the obtained data in the memory.

It should be understood that division into units in the apparatus is merely logical function division. During actual implementation, all or some of the units may be integrated into one physical entity or may be physically separated. In addition, a unit in the apparatus may be implemented in a form of a processor invoking software. For example, the apparatus includes a processor, the processor is connected to a memory, the memory stores instructions, and the processor invokes the instructions stored in the memory, to implement any one of the foregoing methods or functions of units in the apparatus. The processor is, for example, a general-purpose processor, like a CPU or a microprocessor, and the memory is a memory inside the apparatus or a memory outside the apparatus. Alternatively, a unit in the apparatus may be implemented in a form of a hardware circuit, and functions of some or all units may be implemented by designing the hardware circuit. The hardware circuit may be understood as one or more processors. For example, in an implementation, the hardware circuit is an application-specific integrated circuit ASIC, and functions of some or all units are implemented by designing a logical relationship between elements in the circuit. For another example, in another implementation, the hardware circuit may be implemented by using a PLD. Using an FPGA as an example, the FPGA may include a large quantity of logic gate circuits, and a connection relationship between the logic gate circuits is configured by using a configuration file, to implement functions of some or all of the foregoing units. All the units of the foregoing apparatus may be implemented in a form of software invoked by a processor, or may be implemented in a form of a hardware circuit, or some of the units are implemented in a form of software invoked by a processor, and the remaining units are implemented in a form of a hardware circuit.

In embodiments of this application, the processor is a circuit having a signal processing capability. In an implementation, the processor may be a circuit having an instruction reading and running capability, for example, a CPU, a microprocessor, a GPU, or a DSP. In another implementation, the processor may implement a specific function by using a logical relationship of a hardware circuit, and the logical relationship of the hardware circuit is fixed or reconfigurable, for example, the processor is a hardware circuit implemented by an ASIC or a PLD, for example, an FPGA. In the reconfigurable hardware circuit, a process in which the processor loads a configuration document to implement hardware circuit configuration may be understood as a process in which the processor loads an instruction to implement functions of some or all of the foregoing units. In addition, the processor may be a hardware circuit designed for artificial intelligence, and may be understood as an ASIC, for example, an NPU, a TPU, or a DPU.

It can be learned that the units in the foregoing apparatus may be configured to implement one or more processors (or processing circuits) of the foregoing method, for example, a CPU, a GPU, an NPU, a TPU, a DPU, a microprocessor, a DSP, an ASIC, an FPGA, or a combination of at least two of these processor forms.

In addition, all or some of the units in the foregoing apparatus may be integrated, or may be implemented independently. In an implementation, the units are integrated together, and are implemented in a form of an SOC. The SOC may include at least one processor, configured to implement any one of the foregoing methods or implement functions of units of the apparatus. Types of the at least one processor may be different, for example, include a CPU and an FPGA, a CPU and an artificial intelligence processor, a CPU and a GPU, and the like.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data collection system of a vehicle, comprising:

an image collection apparatus disposed on the vehicle, comprising a camera and a drive component, wherein the drive component is configured to drive adjustment of a photographing angle of the camera, so that in an image collected by the camera, an included angle between a lower side line of a body side of the vehicle and a vertical direction of the photographing angle of the camera of the image collection apparatus is automatically adjusted to be less than a first angle; and a control system electrically connected to the image collection apparatus, and configured to:

receive a first instruction, wherein the first instruction is generated in response to enabling of a first mode of the vehicle and wherein the first mode is a sentinel mode for use when the vehicle is parked; and send a first control instruction to the image collection apparatus in response to receiving the first instruction, wherein the first control instruction is used to automatically control the photographing angle of the camera.

2. The system according to claim 1, wherein the control system is further configured to:

send the first control instruction to the image collection apparatus based on the first instruction, wherein the first control instruction is used to control the photographing angle of the camera to be the first angle, so that in the image collected by the camera, the included angle between the lower side line of the body side of the vehicle and the vertical direction of the photographing angle of the camera is less than the first angle.

3. The system according to claim 1, wherein the control system is further configured to:

send a second control instruction to the image collection apparatus, wherein a second control instruction is used to control a photographing frequency of the camera to be a first frequency, and the first control instruction and the second control instruction are the same or different.

4. The system according to claim 3, wherein the control system is further configured to:

obtain sensor data from a sensor, wherein the sensor is a sensor other than the image collection apparatus disposed on the vehicle or is the image collection apparatus; and determine, based on the sensor data, that an object enters a first range around the vehicle.

5. The system according to claim 4, wherein the control system is further configured to:

send a third control instruction to the image collection apparatus, wherein a third control instruction is used to control the photographing frequency of the camera to be a second frequency, and the second frequency is greater than the first frequency.

6. The system according to claim 4, wherein the control system is further configured to:

control the photographing angle of the camera to be adjusted with the object.

7. The system according to claim 4, wherein the control system is further configured to:

receive image data from the image collection apparatus; and when a distance between the object in the image data and the vehicle is less than a first distance, trigger saving and/or sending of the image data, or trigger saving and/or sending of key information in the image data.

8. The system according to claim 6, wherein the control system is further configured to:

determine the object as a non-interfering object based on an environment factor, the non-interfering object includes a shade or a branch of a tree.

9. A data collection method for data collection of a vehicle, comprising:

receiving a first instruction, wherein the first instruction is generated in response to enabling of a first mode of the vehicle and wherein the first mode is a sentinel mode for use when the vehicle is parked;

sending a first control instruction to an image collection apparatus disposed on the vehicle in response to receiving the first instruction, wherein the first control instruction is used to automatically control a photographing angle of the image collection apparatus, so that in an image collected by the image collection apparatus, an included angle between a lower side line of a body side of the vehicle and a vertical direction of the photographing angle of the image collection apparatus is automatically adjusted to be less than a first angle; and obtaining image data from the image collection apparatus.

10. The method according to claim 9, further comprising:

sending the first control instruction to the image collection apparatus based on the first instruction, wherein the first control instruction is used to control the photographing angle of the image collection apparatus to be the first angle, so that in the image collected by the image collection apparatus, the included angle between the lower side line of the body side of the vehicle and the vertical direction of the photographing angle is less than the first angle.

11. The method according to claim 9, further comprising:

sending a second control instruction to the image collection apparatus, wherein the second control instruction is used to control a photographing frequency of the image collection apparatus to be a first frequency, and the first control instruction and the second control instruction are the same or different.

12. The method according to claim 11, further comprising:

obtaining sensor data from a sensor, wherein the sensor is a sensor other than the image collection apparatus disposed on the vehicle or is the image collection apparatus; and determining, based on the sensor data, that an object enters a first range around the vehicle.

13. The method according to claim 12, further comprising:

sending a third control instruction to the image collection apparatus, wherein the third control instruction is used to control the photographing frequency of the image collection apparatus to be a second frequency, and the second frequency is greater than the first frequency.

14. A control apparatus, comprising:

one or more processors; and a memory storing instructions, which when executed by the one or more processors, configures the apparatus to:

obtain a first instruction, wherein the first instruction is generated in response to enabling of a first mode of a vehicle and wherein the first mode is a sentinel mode for use when the vehicle is parked;

send a first control instruction to an image collection apparatus disposed on the vehicle in response to receiving the first instruction, wherein the first control instruction is used to automatically control a photographing angle of the image collection apparatus, so that in an image collected by the image collection apparatus, an included angle between a lower side line of a body side of the vehicle and a vertical direction of the photographing angle of the image collection apparatus is automatically adjusted to be less than a first angle; and obtain image data from the image collection apparatus.

15. The apparatus according to claim 14, wherein the instructions further configures the apparatus to:

send the first control instruction to the image collection apparatus based on the first instruction, wherein the first control instruction is used to control the photographing angle of the image collection apparatus to be the first angle, so that in the image collected by the image collection apparatus, the included angle between the lower side line of the body side of the vehicle and the vertical direction of the photographing angle is less than the first angle.

16. The apparatus according to claim 14, wherein the instructions further configures the apparatus to:

obtain sensor data from a sensor, wherein the sensor is a sensor other than the image collection apparatus disposed on the vehicle or is the image collection apparatus; and determine, based on the sensor data, that an object enters a first range around the vehicle.

17. The apparatus according to claim 16, wherein the instructions further configures the apparatus to:

send a third control instruction to the image collection apparatus, wherein the third control instruction is used to control a photographing frequency of the image collection apparatus to be a second frequency, and the second frequency is greater than a first frequency.

18. The apparatus according to claim 16, wherein the instructions further configures the apparatus to:

control the photographing angle of the image collection apparatus to be adjusted with the object.

19. The apparatus according to claim 16, wherein the instructions further configures the apparatus to:

receive image data from the image collection apparatus; and when a distance between the object in the image data and the vehicle is less than a first distance, trigger saving and/or sending of the image data, or trigger saving and/or sending of key information in the image data.

20. The apparatus according to claim 19, wherein the instructions further configures the apparatus to:

determine, based on an environment factor by performing image segmentation on the image data, that the distance between the object and the vehicle is less than the first distance.

* * * * *